United States Patent [19]

Hashiuchi et al.

[11] Patent Number: 5,900,456
[45] Date of Patent: May 4, 1999

[54] COMPOSITION OF MOLD RELEASE AGENT FOR CASTING

[75] Inventors: Fumio Hashiuchi, Oita; Sachiko Yusa; Yuji Koike, both of Tokyo, all of Japan

[73] Assignees: Nippon Mining & Metals Co., Ltd.; Toshiba Silicone Co., Ltd., both of Tokyo, Japan

[21] Appl. No.: 08/823,677

[22] Filed: Mar. 25, 1997

[30] Foreign Application Priority Data

Mar. 29, 1996 [JP] Japan ................................. 8-077776

[51] Int. Cl.⁶ ........................................................ C08L 83/00
[52] U.S. Cl. ............................ 524/588; 528/15; 528/10; 528/43; 524/837
[58] Field of Search ................... 528/15, 43, 10; 524/588, 837

[56] References Cited

U.S. PATENT DOCUMENTS 4,624,899  11/1986  Macaigne et al. ............... 524/268
5,322,891   6/1994  Takahashi et al. ............... 524/588

FOREIGN PATENT DOCUMENTS 5177294   7/1993  Japan .
8-2475    1/1996  Japan .
2565900  10/1996  Japan .

OTHER PUBLICATIONS

An English Language Abstract of JP 5177294.
An English Language Abstract of JP 8–2475.
An English Language Abstract of JP 2565900.

*Primary Examiner*—Melvyn I. Marquis
*Attorney, Agent, or Firm*—Greenblum & Bernstein, P.L.C.

[57] ABSTRACT

Compositions of a mold release agent for casting are disclosed which are excellent in heat resistance and releasing effect, and contain an organopolysiloxane expressed by the following general formula (1)

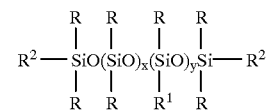

(1)

wherein R represents methyl group or phenyl group, $R^1$ represents an alkyl group, aralkyl group, or aryl group, $R^2$ represents R or $R^1$, x is an integer of from 0 to 1000, y is an integer of from 10 to 1000, and x+y is an integer of from 10 to 2000.

2 Claims, 1 Drawing Sheet

COMPOSITION OF MOLD RELEASE AGENT FOR CASTING

TECHNICAL FIELD

The present invention relates to a composition of a mold release agent for casting. More specifically, the present invention relates to a composition of a mold release agent for casting which can preferably be used for casting an anode for the electrolysis of copper by pouring a melted copper into a mold.

BACKGROUND ART

As a method for casting an anode for the electrolysis of copper, the Walker method is widely adopted wherein a melted copper is poured into mold M arranged horizontally as shown in FIG. 1.

In the casting according to the Walker method, anode A, for the electrolysis of copper, as shown in FIG. 2 is formed by pouring a melted copper comprising a refined crude copper into concave S which is partitioned by upper surface 1a of base portion 1 and inner circumferential surface (or inner side surface) 2a of edge portion 2 protruded toward upward from the upper surface 1a of the base portion 1 of the mold M for the anode.

Heretofore, when horizontal castings is performed by using mold M having such a shape as shown in FIG. 1, specifically at the time when a mold release agent (or parting agent) is applied on the upper surface 1a of the base portion 1, a water soluble composition of a mold release agent prepared by dispersing a powder of a clay in water was used for the purpose of improving the life of a mold or the mold release effect of a cast product.

However, since water soluble compositions of a conventional mold release agent are inferior in heat resistance, when they were used as mold release agent for casting copper, for instance, such problems occurred that a gas is apt to generate on the flat portion of a cast anode for the electrolysis of copper, and unevenness (protuberance) due to the gas is formed and the casting surface of products is dirtily discolored to black to cause an inferior appearance.

As the composition of mold release agent, oil type mold release agents are also known. However, since the oil type mold release agents have a problem of the pollution of work environment and atmospheric air due to soot and fire, and have the problem that the casting surface is dirtily discolored to black, the oil type mold release agents are scarcely used in practice.

DISCLOSURE OF THE INVENTION

An object of the present invention is to provide compositions of a mold release agent which compositions are used for casting, particularly for casting copper, and are excellent in heat resistance and mold release effect.

Another object of the present invention is to provide compositions of a mold release agent which compositions are used for casting, particularly for casting copper, do not cause an inferior appearance, and can improve a harmful work environment in prior art.

Diligent study was carried out by the present inventors on water soluble compositions of mold release agent which are advantageous for improving a harmful work environment in prior art for achieving the purposes mentioned above. As the result, it has been found that water soluble compositions of a mold release agent containing a specific organopolysiloxane (a silicone modified with an alkyl group, aralkyl group, or aryl group) are excellent in heat resistance and mold release effect, leading to the achievement of the present invention.

The present invention relates to a composition of a mold release agent, for casting, particularly for casting copper, containing an organopolysiloxane expressed by the following general formula (1)

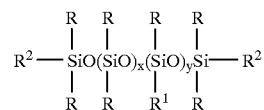

(1)

wherein R represents methyl group or phenyl group, $R^1$ represents an alkyl group, aralkyl group, or aryl group having 6 to 30 carbon atoms, $R^2$ represents R or $R^1$, x is an integer of from 0 to 1000, y is an integer of from 10 to 1000, and x+y is an integer of from 10 to 2000.

Figure 1:
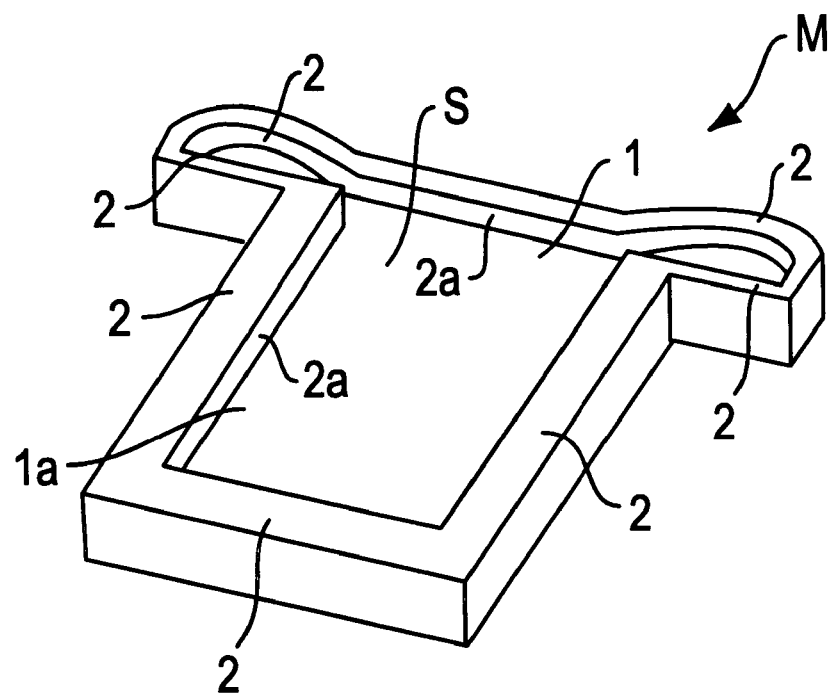
FIG. 1 shows a perspective view of a mold.
Figure 2:
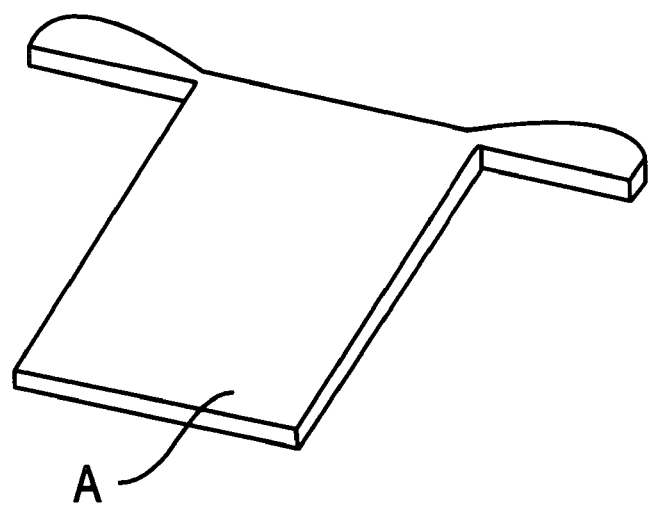
FIG. 2 shows a perspective view of a copper anode.

In the Figures, 1 is a base portion, 2 is an edge portion, A is a copper anode, and M is a mold.

BEST MODE FOR CARRYING OUT THE INVENTION

The compositions of a mold release agent of the present invention will be described in detail below. The present compositions of a mold release agent are used for casting a metal, and advantageously used for casting copper.

In the compositions, the organopolysiloxane which is a major component of the compositions is excellent in heat resistance, readily remains on the surface of a mold, and prevents the contact or deposit of a metal on metal, and has a function of increasing the wettability of a melted metal to a mold. As a result of those advantages, it becomes possible to produce cast products having a good mold releasability and excellent casting surface without causing problems of polluting working environment and atmospheric air.

In the general formula (1) mentioned and above showing organopolysiloxanes, $R^1$ represents an alkyl group, aralkyl group, or aryl group having 6 to 30 carbon atoms. When the number of carbon atoms of $R^1$ is less than 6, the heat resistance of the compositions is insufficient, and the mold comes easily to be deteriorated due to the inferior film formation in a mold. On the other hand, when the number of carbon atoms of $R^1$ exceeds 30, a stable supply of an α-olefin which is a starting raw material of the compositions becomes difficult.

As the alkyl group, hexyl group, octyl group, decyl group, dodecyl group, tridecyl group, and tetradecyl group can be exemplified; as the aralkyl group, styryl group and α-methylstyryl group can be exemplified; and as the aryl group, phenyl group can be exemplified. Among these, aralkyl group and alkyl group are particularly preferred from the viewpoint of excellent mold release. In the aspect of a small amount of gas generation, it is preferable that 50% by mole or more, more desirably 60% by mole or more of $R^1$ is preferably an aralkyl group.

In the formula (1) mentioned and above showing organopolysiloxanes, x is an integer of from 0 to 1000, y is an integer of from 10 to 1000, and x+y is an integer of from 10 to 2000. When x+Y is less than 10, the heat resistance of the compositions is insufficient, and when x+Y exceeds 2000, the viscosity of the compositions is too high and emulsification of the mold release agent becomes difficult. In the present invention, y/(x+y) is preferably from 0.5 to 1.0 and more desirably from 0.8 to 1.0 particularly from the viewpoint of no deposit on the surface of cast products particularly when the organopolysiloxanes are used as the mold release agent for casting copper, for instance, for casting an anode for the electrolysis of copper.

The content of such organopolysiloxane is preferably 1 to 70 parts by weight when the total weight of whole components of the composition of a mold release agent was assumed to be 100 parts by weight. When the content of the organopolysiloxane is less than 1 part by weight, it does not have an effect of preventing sand burning. On the other hand, when the content of the organopolysiloxane exceeds 70 parts by weight, it becomes impossible to obtain their stable emulsion.

In the compositions of a mold release agent of the present invention, a mineral oil such as a spindle oil and machine oil, fat and oil such as a soybean oil, rapeseed oil, beef tallow, lard, and palm oil, fatty acid ester, fatty acid, synthetic ester, and polyethylene wax or its oxide, wax such as a paraffin wax and microcrystalline wax, inorganic compound such as an antioxidant, antiseptics, antifungal agent, rust inhibitor, extreme-pressure lubricating oil, and talc, thickener, dispersant, wetting agent, and emulsifier can suitably be used as additive.

The compositions of a mold release agent of the present invention used preferably for casting copper and having the formation as discussed above can readily be produced, for example, by blending 20 to 70% by weight of the organopolysiloxane expressed by the formula (1) mentioned above, 2 to 10% by weight of an emulsifier, and 78 to 20% by weight of water, and an additive, when required, and then emulsifying the blend by using an emulsifying machine such as a homogenizer, colloid mill, line mixer, homomixer, and microfluidizer.

The organopolysiloxane mentioned above can readily be synthesized, for instance, by adding, for example, the α-olefin expressed by formula $CH_2=CH(CH_2)_3CH_3$, styrene, or α-methyl styrene to methylhydropolysiloxane or a copolymer of dimethyl siloxane with methylhydrosiloxane by using a catalyst such as chloro platinic acid.

As the emulsifier mentioned above, nonionic surfactants anionic surfactants, and cationic surfactants can be mentioned as examples. Specifically polyoxyalkylene alkyl ethers, polyoxyalkylene alkylphenol ethers, polyoxyalkylene alkyl esters, sorbitan alkyl esters, polyoxyalkylene sorbitan alkyl esters, polyethylene glycol, and polypropylene glycol can be exemplified as the nonionic surfactant.

As the cationic surfactant, quaternary ammonium hydroxides such as octyltrimethylammonium hydroxide, dodecyltrimethylammonium hydroxide, hexadecyltrimethylammonium hydroxide, octyldimethylbenzylammonium hydroxide decyldimethylbenzylammonium hydroxide, didodecyldimethylammonium hydroxide, dioctadecyldimethylammonium hydroxide, beef tallow trimethylammonium hydroxide, and coconut oil trimethylammonium hydroxide, and their salts can be exemplified.

As the anionic surfactant, higher fatty acids such as stearic acid, oleic acid, and lauric acid; alkylbenzenesulfonic acids such as hexylbenzenesulfonic acid, octylbenzenesulfonic acid, decylbenzenesulfonic acid, dodecylbenzenesulfonic acid, cetylbenzenesulfonic acid, and myristylbenzenesulfonic acid; sulfuric acid ester of polyoxyethylene monoalkyl ethers such as $CH_3(CH_2)CH_2O(C_2H_4)_2SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_8CH_2CH_2C_6H_4O(C_2H_4O)_2SO_3H$; and sodium salt, potassium salt, lithium salt, or amine salt of alkylnaphthylsulfonic acids can be exemplified.

Such surfactants are generally used in a nonionic surfactant alone, a combination of a nonionic surfactant with an anionic surfactant, or a combination of a nonionic surfactant with a cationic surfactant.

According to the present invention, compositions of a mold release agent preferably for casting copper can be provided which stably produce cast products having an excellent mold releasability and good casting surface. Further, when the compositions of a mold release agent of the present were used, injurious work environment in prior art can be improved.

EXAMPLE

Now, the present invention will be described in more detail with reference to Examples and Comparative Example. However, it should be understood that the present invention is by no means restricted by such specific Examples. In the Examples, viscosity was determined at 25° C.

Examples

In Examples, emulsion compositions containing, as a main component, an organopolysiloxane having the structural formula and viscosity shown below were used. The emulsion composition were prepared by putting 50 parts by weight of organopolysiloxane (A), (B), (C), or (D), and 3 parts by weight of polyoxyethylene(5)lauryl ether and 2 parts by weight of polyoxyethylene(20)nonylphenyl ether as emulsifier into a flask, uniformly stirring them, adding 50 parts by weight of water thereto, and then subjecting them to a homogenizer treatment.

(A)

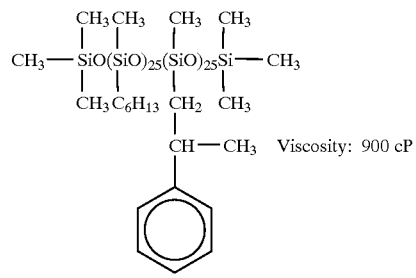

(B)

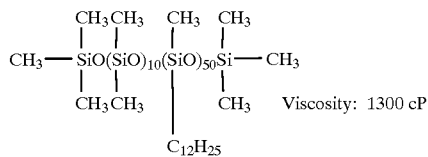

-continued

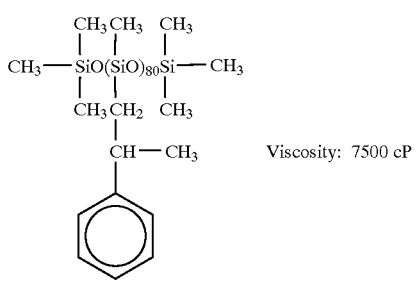

(C) Viscosity: 7500 cP

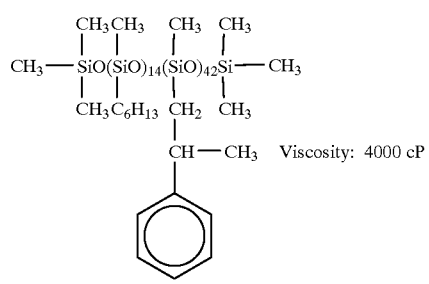

(D) Viscosity: 4000 cP

Comparative Example

In Comparative Example, a conventional composition of a mold release agent in which a powder of a clay was dispersed in water in a ratio of 20 g/l was used.

Performance Test

Tests for performances of the compositions were carried out for the following items.

Paintability:

A sample composition of a mold release agent was diluted with water 50 times, uniformly sprayed on the surface of the sheet of a gray coat paper by using a simplified spray gun, and then dried at room temperature. Subsequently, lines were drawn on the surface of the sheet at constant intervals with an oil type magic ink pen for thick line using a ruler, the extent of blurring of the lines was observed, and the paintability was graded as follows:

○: The lines were not blurred at all and the magic ink was uniformly adhered on the surface of the sheet.

Δ: The lines were slightly blurred and the magic ink was slightly not-uniformly adhered on the surface of the sheet.

X: The lines were remarkably blurred.

Mold releasability:

A sample composition of a mold release agent which was diluted with water 5 times was sprayed on the surface of a mold having a size of 100 cm×100 cm×65 mm (depth), bottom of the mold was irregular and had many grooves, and the mold was preheated at about 200° C. A melted copper which was melted at about 1200° C. in a refining furnace was poured in the mold. After the mold was slowly cooled, the copper piece thus formed was peeled off the mold, the extent of the peeling off was observed, and the mold releasability was graded as follows:

◉: Peeling off was extremely good.

○: Peeling off was good.

Δ: Peeling off was slightly bad.

X: Peeling off was difficult.

Results of the evaluation in the performance tests mentioned above are shown in Table 1. As will be clear from the results shown in Table 1, the compositions of a mold release agent, particularly for casting copper, of the present invention were excellent in paintability and mold releasability.

TABLE 1

|  | Mold release agent of Example | | | | Comparative Example |
|---|---|---|---|---|---|
|  | (A) | (B) | (C) | (D) |  |
| Paintability | ○ | ◉ | ○ | ◉ | Δ |
| Mold releasability | ◉ | ◉ | ◉ | ◉ | ○ |

When an anode for the electrolysis of copper was actually cast with a real casting machine by using a conventional mold release agent, it was necessary to apply the mold release agent on the surface of the mold each time. However, it was found that once per twice of the application was sufficient when the compositions of mold release agent of the present invention were used. In other words, it was found that the compositions of a mold release agent of the present invention are excellent in adhesion at high temperatures and good both in heat resistance and mold releasability compared with conventional ones. Further, it was found that, according to the present invention, the amount of generated gas is small and the casting surface of cast products to be obtained is good compared with the cases where conventional compositions of a mold release agent were used. Still further, the mold release agents of the present invention did not cause a problem of worsening work environment or polluting atmospheric air.

Specifically, in the Comparative Example mentioned above wherein a conventional composition of a mold release agent was used, carbons were remained as deposit on the surface of the cast anode used for the electrolysis of copper. However, the anodes for the electrolysis of copper obtained in Examples where compositions of a mold release agent of the present invention was used had a metallic casting surface and had no carbon deposit. Accordingly, when the electrolysis of copper was carried out by using the metallic anode for the electrolysis of copper, copper suboxide due to the oxidation with the carbons was not be formed and anode slime was not be produced. As the result, current efficiency was confirmed to increase.

We claim:

1. water soluble composition of a mold release agent for casting copper, consisting essentially of:

20 to 70 wt % of an organopolysiloxane;

2 to 10 wt % of a nonionic surface active agent; and a remaining amount being water; and wherein the organopolysiloxane has the formula (1):

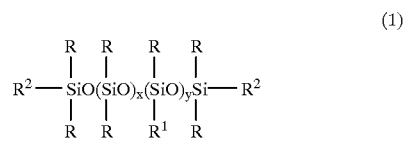

(1)

wherein R represents methyl group or phenyl group, $R^1$ represents an alkyl group, aralkyl group, or aryl group having 6 to 30 carbon atoms, $R^2$ represents R or $R^1$, x is an integer of from 0 to 1000, y is an integer of from 10 to 1000, and x+y is an integer of from 10 to 2000.

2. The composition of claim 1, wherein y/(x+y) is 0.5 to 1.0.

* * * * *